(12) United States Patent
Dong et al.

(10) Patent No.: US 12,065,016 B2
(45) Date of Patent: Aug. 20, 2024

(54) HEAT PUMP SYSTEM

(71) Applicant: HANGZHOU SANHUA RESEARCH INSTITUTE CO., LTD., Hangzhou (CN)

(72) Inventors: Junqi Dong, Hangzhou (CN); Qiaofeng Liu, Hangzhou (CN); Shiwei Jia, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 207 days.

(21) Appl. No.: 17/253,037

(22) PCT Filed: Oct. 15, 2019

(86) PCT No.: PCT/CN2019/111151
§ 371 (c)(1),
(2) Date: Dec. 16, 2020

(87) PCT Pub. No.: WO2020/134371
PCT Pub. Date: Jul. 2, 2020

(65) Prior Publication Data
US 2021/0260955 A1    Aug. 26, 2021

(30) Foreign Application Priority Data
Dec. 28, 2018 (CN) .......................... 201811618080.1

(51) Int. Cl.
*B60H 1/00* (2006.01)
*B60H 1/22* (2006.01)
(Continued)

(52) U.S. Cl.
CPC ..... *B60H 1/00921* (2013.01); *B60H 1/00392* (2013.01); *B60H 1/22* (2013.01);
(Continued)

(58) Field of Classification Search
CPC .. B60H 1/00921; B60H 1/00392; B60H 1/22; B60H 2001/00928; B60H 2001/00935;
(Continued)

(56) References Cited

U.S. PATENT DOCUMENTS

| | | | | |
|---|---|---|---|---|
| 4,793,143 A | * | 12/1988 | Rhodes | ................. F24F 3/1429 62/93 |
| 2001/0003311 A1 | * | 6/2001 | Karl | ........................ F25B 41/20 62/196.4 |

(Continued)

FOREIGN PATENT DOCUMENTS

| CN | 103358851 A | 10/2013 |
|---|---|---|
| CN | 103373193 A | 10/2013 |

(Continued)

OTHER PUBLICATIONS

Noda et al. [JP-H106762-A], machine translation (Year: 2023).*
Yoshida [WO-2009096442-A1], machine translation (Year: 2023).*

*Primary Examiner* — Larry L Furdge
*Assistant Examiner* — Keith Stanley Myers
(74) *Attorney, Agent, or Firm* — Cheng-Ju Chiang

(57) ABSTRACT

A heat pump system includes a compressor, a fluid switching device, a first heat exchanger, a second heat exchanger, a third heat exchanger, a fourth heat exchanger, a flow regulating device and a throttle element. The second heat exchanger includes a first heat exchange portion and a second heat exchange portion. An outlet of the first heat exchange portion communicates with the throttle element. An inlet of the first heat exchange portion communicates with at least one of a second port of the third heat exchanger and an outlet of the fourth heat exchanger. An inlet of the second heat exchange portion communicates with the outlet of the first heat exchanger. An outlet of the second heat exchange portion communicates with an inlet of the compressor. In a heating mode, the function of the second heat (Continued)

exchanger is reduced, thereby the heating capacity of the heat pump system is improved.

12 Claims, 9 Drawing Sheets

(51) Int. Cl.
  *B60H 1/32* (2006.01)
  *F25B 5/02* (2006.01)
  *F25B 6/04* (2006.01)
  *F25B 13/00* (2006.01)
  *F25B 40/00* (2006.01)
  *F25B 41/20* (2021.01)
  *F25B 41/30* (2021.01)
  *F25B 41/42* (2021.01)

(52) U.S. Cl.
  CPC .............. *B60H 1/3213* (2013.01); *F25B 5/02* (2013.01); *F25B 6/04* (2013.01); *F25B 13/00* (2013.01); *F25B 40/00* (2013.01); *F25B 41/20* (2021.01); *F25B 41/30* (2021.01); *F25B 41/42* (2021.01); *B60H 2001/00928* (2013.01); *B60H 2001/00935* (2013.01); *B60H 2001/00957* (2013.01); *B60H 2001/3291* (2013.01); *F25B 2600/2507* (2013.01); *F25B 2600/2513* (2013.01); *F25B 2600/2515* (2013.01); *F25B 2700/1933* (2013.01); *F25B 2700/21151* (2013.01)

(58) Field of Classification Search
  CPC .... F25B 5/02; F25B 6/04; F25B 13/00; F25B 41/20; F25B 41/30; F25B 41/42; F25B 2600/2507; F25B 2600/2513; F25B 2600/2515
  See application file for complete search history.

(56) References Cited

U.S. PATENT DOCUMENTS

| | | | | |
|---|---|---|---|---|
| 2001/0052238 A1* | 12/2001 | Burk | ................... | B60H 1/00921 62/323.1 |
| 2002/0046570 A1* | 4/2002 | Itoh | ...................... | F25B 41/335 62/503 |
| 2004/0011070 A1* | 1/2004 | Satzger | ................... | F25B 40/00 62/323.1 |
| 2004/0055320 A1* | 3/2004 | Horstmann | ............ | F25B 40/00 62/196.4 |
| 2004/0129012 A1* | 7/2004 | Feuerecker | ........ | B60H 1/00921 62/278 |
| 2004/0134216 A1* | 7/2004 | Heyl | ....................... | F25B 41/20 62/324.1 |
| 2005/0034473 A1* | 2/2005 | Casar | ..................... | F25B 9/008 62/324.1 |
| 2005/0204768 A1* | 9/2005 | Di Vito | ................... | F25B 9/008 62/324.1 |
| 2007/0283703 A1* | 12/2007 | Heckt | ..................... | F25B 41/20 62/3.61 |
| 2011/0167850 A1 | 7/2011 | Itoh et al. | | |
| 2012/0031140 A1* | 2/2012 | Zhang | .................... | F25D 16/00 62/498 |
| 2013/0160985 A1* | 6/2013 | Chen | ....................... | F25B 13/00 165/201 |
| 2017/0151857 A1* | 6/2017 | Suzuki | ..................... | F25B 6/04 |
| 2017/0210202 A1* | 7/2017 | Suzuki | ................. | B60H 1/3207 |
| 2019/0145669 A1* | 5/2019 | Tanaka | .................. | F25B 39/028 62/115 |
| 2020/0023709 A1* | 1/2020 | Schroeder | .......... | B60H 1/00907 |
| 2021/0260955 A1* | 8/2021 | Dong | ................. | B60H 1/00392 |

FOREIGN PATENT DOCUMENTS

| | | | | |
|---|---|---|---|---|
| CN | 103707736 A | 4/2014 | | |
| CN | 103712277 A | 4/2014 | | |
| CN | 104121720 A | 10/2014 | | |
| CN | 104121722 A | 10/2014 | | |
| CN | 104290561 A | 1/2015 | | |
| CN | 105247297 A | 1/2016 | | |
| CN | 104121722 B | * 3/2016 | | |
| CN | 104121722 B | 3/2016 | | |
| CN | 106739947 A | 5/2017 | | |
| CN | 107499088 A | 12/2017 | | |
| DE | 112012005123 T5 | 11/2014 | | |
| EP | 1695849 A1 | 8/2006 | | |
| JP | H106762 A | * 6/1996 | | |
| JP | H10-6762 A | 1/1998 | | |
| KR | 10-2014-0023733 A | 2/2014 | | |
| WO | WO-2009096442 A1 | * 8/2009 | ............. | F25B 40/00 |

* cited by examiner

HEAT PUMP SYSTEM

CROSS-REFERENCE TO RELATED APPLICATION

This patent application is a 35 U.S.C. § 371 National Phase conversion of International (PCT) Patent Application No. PCT/CN2019/111151, filed on Oct. 15, 2019, which claims priority of a Chinese Patent Application No. 201811618080.1, filed on Dec. 28, 2018 and titled "heat pump system", the entire content of which is incorporated herein by reference. The PCT International Patent Application was filed and published in Chinese.

TECHNICAL FIELD

The present application relates to a field of thermal management technology, in particular to a heat pump system.

BACKGROUND

With the rapid development of new energy vehicles, heat pump systems are more and more favored by vehicle companies. In a new energy vehicle air-conditioning system, the heat pump system is a device which realizes cooling, heating, ventilation and air purification of the air in the cabin. It can provide passengers with a comfortable riding environment, reduce the fatigue strength of the driver, and improve driving safety.

Currently, intermediate heat exchangers are added to the air-conditioning systems to improve the cooling capacity and energy efficiency of the systems. In cooling and heating modes, the intermediate heat exchangers play a role of heat recovery.

SUMMARY

In view of this, the present application proposes a heat pump system to help improve the performance of the heat pump system during heating.

In order to achieve the above purpose, the technical solution adopted in the present application provides a heat pump system including a compressor, a first heat exchanger, a second heat exchanger, a third heat exchanger, a fourth heat exchanger, a flow regulating device and a throttle element. The second heat exchanger includes a first heat exchange portion and a second heat exchange portion which are capable of exchanging heat with each other. The throttle element is connected between an outlet of the first heat exchange portion and an inlet of the first heat exchanger. An inlet of the first heat exchange portion is capable of communicating with at least one of a second port of the third heat exchanger and an outlet of the fourth heat exchanger. The flow regulating device is connected between the second port of the third heat exchanger and the inlet of the first heat exchange portion. A first port of the third heat exchanger is capable of communicating with an inlet of the compressor, and the outlet of the fourth heat exchanger is capable of communicating with the second port of the third heat exchanger through the flow regulating device; or, the first port of the third heat exchanger communicates with the outlet of the fourth heat exchanger, and the fourth heat exchanger is capable of communicating with the flow regulating device through the third heat exchanger. An inlet of the second heat exchange portion communicates with an outlet of the first heat exchanger, and an outlet of the second heat exchange portion is capable of communicating with the inlet of the compressor. The heat pump system includes a heating mode in which the first port of the third heat exchanger is in communication with the inlet of the compressor, an outlet of the compressor is in communication with an inlet of the fourth heat exchanger, the outlet of the fourth heat exchanger is in communication with the second port of the third heat exchanger through the flow regulating device, the throttle element is closed, and the flow regulating device throttles and depressurizes a refrigerant.

The present invention further provides a heat pump system including a compressor, a first heat exchanger, a second heat exchanger, a third heat exchanger, a fourth heat exchanger, a flow regulating device and a throttle element. The first heat exchanger and the fourth heat exchanger are both located in an air-conditioning box. The second heat exchanger includes a first heat exchange portion and a second heat exchange portion which exchange heat with each other, the throttle element is connected between an outlet of the first heat exchange portion and an inlet of the first heat exchanger. An inlet of the first heat exchange portion is capable of communicating with at least one of a second port of the third heat exchanger and an outlet of the fourth heat exchanger. The flow regulating device is connected between the second port of the third heat exchanger and the inlet of the first heat exchange portion. A first port of the third heat exchanger is capable of communicating with an inlet of the compressor, and the outlet of the fourth heat exchanger is capable of communicating with the second port of the third heat exchanger through the flow regulating device; or, the first port of the third heat exchanger communicates with the outlet of the fourth heat exchanger, and the fourth heat exchanger is capable of communicating with the flow regulating device through the third heat exchanger. An inlet of the second heat exchange portion communicates with an outlet of the first heat exchanger, and an outlet of the second heat exchange portion communicates with the inlet of the compressor. The heat pump system includes a heating mode in which the first port of the third heat exchanger is in communication with the inlet of the compressor, an outlet of the compressor is in communication with an inlet of the fourth heat exchanger, the outlet of the fourth heat exchanger is in communication with the second port of the third heat exchanger through the flow regulating device, the throttle element is closed, and the flow regulating device throttles and depressurizes a refrigerant. The heat pump system includes a cooling mode in which the outlet of the compressor is in communication with the inlet of the fourth heat exchanger, the first port of the third heat exchanger communicates with the outlet of the fourth heat exchanger, the throttle element throttles and depressurizes the refrigerant, and the flow regulating device is opened. The heat pump system includes a dehumidifying mode in which the outlet of the compressor is in communication with the inlet of the fourth heat exchanger, the inlet of the first heat exchange portion communicates with the outlet of the fourth heat exchanger, the flow regulating device is closed, and the throttle element throttles and depressurizes the refrigerant. The heat pump system includes a heating and dehumidifying mode in which the second port of the third heat exchanger and the outlet of the fourth heat exchanger are both in communication with the inlet of the first heat exchange portion, the first port of the third heat exchanger communicates with the inlet of the compressor, the outlet of the compressor is in communication with the inlet of the fourth heat exchanger, the throttle element is opened, and the flow regulating device is opened.

An intermediate heat exchanger is added to the heat pump system of the present application. The intermediate heat exchanger includes a first heat exchange portion and a second heat exchange portion which exchange heat with each other. The outlet of the first heat exchange portion is connected with a throttle element. Under the heating condition, the throttle element is closed to reduce the heat exchange capacity of the intermediate heat exchanger, so that the heating capacity of the heat pump system can be effectively used.

It should be understood that the above general description and the following detailed description are only exemplary and explanatory purposes, and shall not limit the present application.

DETAILED DESCRIPTION

Figure 1:
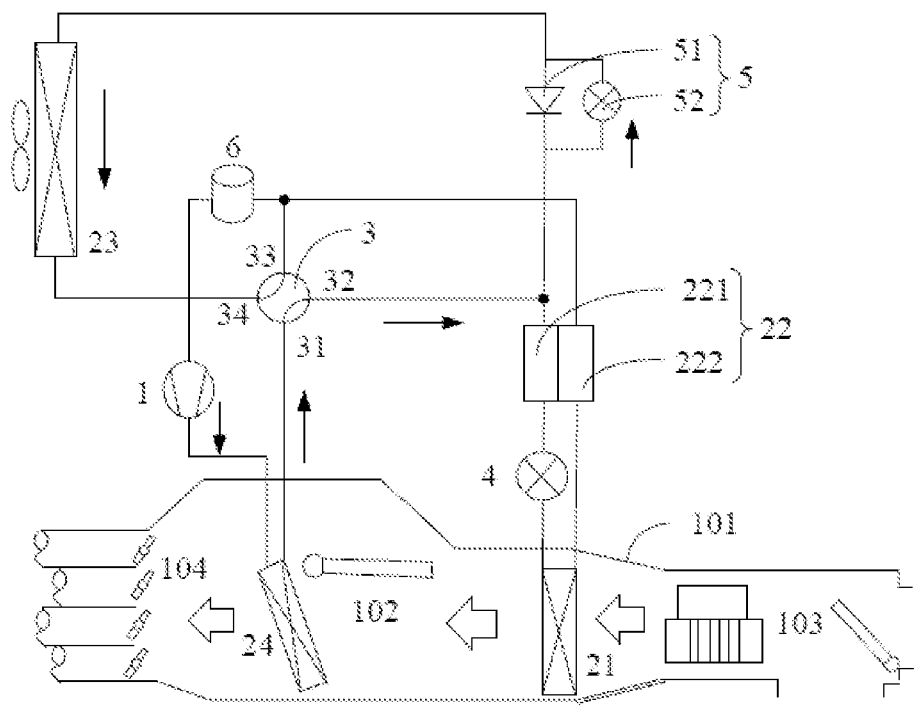
FIG. 1 is a schematic diagram of a heat pump system in a heating mode according to an exemplary embodiment of the present application.

The present application will be described in detail below in conjunction with the specific embodiments shown in the drawings. However, these embodiments shall not limit the present application, and the structural, method, or functional changes made by those skilled in the art according to these embodiments are all included in the protection scope of the present application.

The terms used in the present application are only for the purpose of describing specific embodiments, and are not intended to limit the present application. The singular forms "a", "the" and "said" used in the present application and appended claims are also intended to include plural forms, unless the context clearly indicates otherwise. It should also be understood that the term "and/or" used in the present application refers to and includes any or all possible combinations of one or more associated listed items.

Hereinafter, some embodiments of the present application will be described in detail with reference to the accompanying drawings. In the case of no conflict, the following embodiments and features in the embodiments can be combined with each other. One or more implementations of the heat pump systems of the present application may be applicable to household air-conditioning systems, vehicle air-conditioning systems, or commercial air-conditioning systems. The heat pump systems for vehicles are described below as an example.

As shown in FIG. 1, the present application provides a heat pump system which has multiple working modes such as a heating mode, a cooling mode, a dehumidifying mode (also known as a defogging mode), and a heating and dehumidifying mode. The heat pump system in the embodiment of the present application is applied to a vehicle. The heat pump system is a device which realizes cooling, heating, ventilation and air purification of the air in a vehicle cabin.

Specifically, the heat pump system includes a compressor 1, a fluid switching device 3, a first heat exchanger 21, a second heat exchanger 22, a third heat exchanger 23, a fourth heat exchanger 24, a flow regulating device 5 and a throttle element 4. Of course, the heat pump system may also include multiple components and control valves. Through the adjustment of the components and the control valves, the heat pump system of the present application can realize cooling, heating, dehumidifying, and heating and dehumidifying etc.

It should be noted that, in the embodiments of the present application, the sequential communication only describes the sequence relationship of the connections among various components, and the various components may also include other components, such as a shut-off valve etc.

The heat pump system also includes an air-conditioning box 101 for adjusting the temperature and/or humidity in the vehicle cabin. The air-conditioning box 101 is provided with an air duct. The first heat exchanger 21 and the fourth heat exchanger 24 are arranged in the air-conditioning box 101. The heat pump system may also include a baffle 102 which is arranged between the first heat exchanger 21 and the fourth heat exchanger 24, so as to control the air volume blowing to the fourth heat exchanger 24. As a result, volume of the cold air or the hot air blowing into the vehicle cabin can be controlled.

The above-mentioned first heat exchanger 21 and second heat exchanger 22 can selectively heat, cool or defog the vehicle cabin according to operating conditions in the vehicle cabin. It is understandable that the above-mentioned first heat exchanger 21 and the second heat exchanger 22 can be installed not only in the vehicle cabin, but also outside of the vehicle cabin and blow air into the vehicle cabin through an air supply duct. In this embodiment, the first heat exchanger 21 can be an indoor evaporator, and the fourth heat exchanger 24 can be an indoor condenser.

In the embodiment of the present application, a blower 103 is further provided on a side of the first heat exchanger 21 away from the baffle 102. The blower 103 is provided at one end of the air duct, and the other end of the air duct is provided with a grille 104 for blowing air into the vehicle cabin. The blower 103 is used to accelerate the flow of air and improve the working efficiency of the air-conditioning system. In the case of high air humidity, if only dehumidifying is required, the position of the baffle 102 can be controlled so that the baffle 102 can completely block the fourth heat exchanger 24, so that the air blown by the blower 103 cannot be directly blown to the fourth heat exchanger 24. The blower 103 can be selected as an air blower or others. In addition, a damper in the air-conditioning box 101 may or may not be provided.

The second heat exchanger 22 includes a first heat exchange portion 221 and a second heat exchange portion 222 which are capable of exchanging heat with each other.

The first heat exchange portion 221 and the second heat exchange portion 222 are not in communication with each other in the second heat exchanger 22. The fluid flow in the first heat exchange portion 221 and in the second heat exchange portion 222 are performed independently, and heat exchange can be performed therebetween. In this embodiment, the second heat exchanger 22 is an intermediate heat exchanger. The first heat exchange portion 221 is used to flow in a relatively high pressure refrigerant. The second heat exchange portion 222 is used to flow in a relatively low pressure refrigerant.

The throttle element 4 is communicated between an outlet of the first heat exchange portion 221 and an inlet of the first heat exchanger 21. An inlet of the first heat exchange portion 221 is capable of communicating with a second port of the third heat exchanger 23 through the flow regulating device 5, or the inlet of the first heat exchange portion 221 is communicated with an outlet of the fourth heat exchanger 24, or the inlet of the first heat exchange portion 221 can be communicated with the outlet of the fourth heat exchanger 24 and the second port of the third heat exchanger 23 at the same time. An inlet of the second heat exchange portion 222 and an outlet of the first heat exchanger 21 are communicated by a pipeline. An outlet of the second heat exchange portion 222 and an inlet of the compressor 1 are communicated by a pipeline. In this embodiment, the throttle element 4 is defined as an electronic expansion valve.

The fluid switching device 3 includes a first port 31, a second port 32, a third port 33 and a fourth port 34. The first port 31 is capable of communicating with an outlet of the compressor 1 and the outlet of the fourth heat exchanger 24. The second port 32 is capable of communicating with the inlet of the first heat exchange portion 221 and/or the flow regulating device 5. The third port 33 is capable of communicating with the outlet of the second heat exchange portion 222 and/or the inlet of the compressor 1. The fourth port 34 communicates with the first port of the third heat exchanger 23.

In this embodiment, the flow regulating device 5 is a combined valve which includes an electronic expansion valve 52 and a check valve 51 connected in parallel. An inlet of the check valve 51 communicates with the second port of the third heat exchanger 23. An outlet of the check valve 51 is respectively connected to the second port 32 of the fluid switching device 3 and the inlet of the first heat exchange portion 221.

In some embodiments, the flow regulating device 5 may further include a throttle unit 52 and a valve unit 51. The second port of the third heat exchanger 23 is capable of communicating with the inlet of the first heat exchange portion 221 through the valve unit 51. The outlet of the fourth heat exchanger 24 is capable of communicating with the second port of the third heat exchanger 23 through the throttle unit 52. Specifically, in one embodiment, the throttle unit 52 and the valve unit 51 are provided separately. The throttle unit 52 includes two ports. A first port of the throttle unit 52 is capable of communicating with the first port of the flow regulating device 5, and a second port of the throttle unit 52 is capable of communicating with the second port of the flow regulating device 5. The valve unit 51 includes two ports. A first port of the valve unit 51 communicates with the first port of the flow regulating device 5, and a second port of the valve unit 51 is capable of communicating with the second port of the flow regulating device 5. In other embodiments, the valve unit 51 includes three ports. A first port of the valve unit 51 is capable of communicating with the first port of the flow regulating device 5, a third port of the valve unit 51 is capable of communicating with the first port of the throttle unit 52, and a second port of the valve unit 51 is capable of communicating with the second port of the flow regulating device 5. Or, the first port of the valve unit 51 communicates with the second port of the flow regulating device 5, the third port of the valve unit 51 communicates with the second port of the throttle unit 52, and the first port of the throttle unit 52 communicates with the first port of the flow regulating device 5. The second port of the valve unit 51 communicates with the first port of the flow regulating device 5. In another embodiment, the valve unit 51 and the throttle unit 52 are integrally provided. The flow regulating device 5 includes a valve body. The corresponding ports of the valve unit 51 and the throttle unit 52 are provided in the valve body. Here, the valve unit 51 and the throttle unit 52 may both have valve cores. The valve unit 51 and the throttle unit 52 can also share a valve core, which is not described in detail here. The valve unit 51 may also be a check valve. The check valve is arranged in parallel with the throttle unit 52. An inlet of the check valve communicates with the second port of the third heat exchanger 23. An outlet of the check valve is capable of communicating with the inlet of the second heat exchanger 22. Alternatively, the check valve and the throttle unit 52 are integrally provided. The flow regulating device 5 includes a valve body. The check valve and the corresponding ports of the throttle unit 52 are provided on the valve body. Details of that will not be described here. In addition, the heat pump system also includes a gas-liquid separator 6. An inlet of the gas-liquid separator 6 is capable of communicating with the first port of the third heat exchanger 23 and/or the outlet of the second heat exchange portion 222. An outlet of the gas-liquid separator 6 is in communication with the inlet of the compressor 1.

Working principles of this embodiment in different working modes are as follows:

When heating is required in the vehicle in winter, the heat pump system is switched to the heating mode. As shown in FIG. 1, in the heating mode, the throttle element 4 is closed, the flow regulating device 5 throttles and depressurizes the refrigerant, the first port 31 and the second port 32 of the fluid switching device 3 are in communication with each other, and the third port 33 and the fourth port 34 of the fluid switching device 3 are in communication with each other. At this time, the compressor 1, the fourth heat exchanger 24, the fluid switching device 3, the flow regulating device 5, the third heat exchanger 23, the gas-liquid separator 6 and the compressor 1 are communicated in sequence to form a loop. In this embodiment, the throttle element 4 is closed so that no refrigerant will flow into the intermediate heat exchanger 22. The intermediate heat exchanger 22 does not work at all, and the heating capacity of the heat pump system can be effectively utilized.

In order to make the compressor 1 work in a relatively efficient range, the discharge temperature of the compressor 1 should not be too high. Therefore, under some working conditions, the use of the second heat exchanger 22 will limit the operating range of the compressor 1 to a certain extent, which is detrimental to the performance of the system. For example: in an ultra-low temperature heating mode, in order to absorb heat in a lower ambient temperature, the evaporation pressure of the system is relatively low and the pressure ratio of compressor 1 is large. In order to keep the discharge temperature of the compressor 1 within the preset range, the discharge pressure of the compressor 1 is restricted to a certain extent, and the performance of the system is restricted accordingly. Therefore, in the heating mode, the heat pump system of the present application does not use the second heat exchanger 22 or does not fully utilize the heat exchange capacity of the second heat exchanger 22 so as to realize the efficient operation of the heat pump system under heating conditions.

In the heating mode, the compressor 1 consumes a certain amount of electric energy to compress the low-pressure gaseous refrigerant into a high-pressure gaseous refrigerant. The high-pressure gaseous refrigerant then enters the fourth heat exchanger 24. Under the cooling of the indoor air flow, the heat of the refrigerant is transferred to a low-temperature indoor air flow, and its temperature is lowered. After the refrigerant flows out of the fourth heat exchanger 24, since the throttle element 4 is closed, the refrigerant flows through the fluid switching device 3, then flows to the flow regulating device 5, and then flows to the third heat exchanger 23 after being throttled and depressurized by the flow regulating device 5. The third heat exchanger 23 exchanges heat with the outdoor air flow, and after absorbing the heat, it becomes a low-temperature and low-pressure gas refrigerant or a gas-liquid two-phase refrigerant. After the refrigerant flows out of the third heat exchanger 23, it flows to the gas-liquid separator 6 through the fluid switching device 3. After separation by the gas-liquid separator 6, a liquid refrigerant is stored in the gas-liquid separator 6, and a gaseous refrigerant flows into the compressor 1 and is compressed by the compressor 1 into a high-temperature and high-pressure gaseous refrigerant, and the cycle works in this way.

In this embodiment, the indoor air flow is heated by the fourth heat exchanger 24 and blew into the vehicle cabin after flowing through the air duct and the grille 104. As a result, the temperature inside the vehicle is increased to provide users with a comfortable riding environment. In addition, there is no or very small amount of refrigerant circulating in the first heat exchanger 21 during heating of the vehicle air-conditioning system of the present application. In this way, the air blown by the blower 103 does not undergo heat exchange when flowing through the first heat exchanger 21, but directly reaches the fourth heat exchanger 24 with a high refrigerant temperature for heat exchange. And, if the ambient temperature is too low, the heating performance of the heat pump is insufficient, or the efficiency of the heat pump is low, or even the heat pump cannot work, an electric heater can be used to assist heating. The heating function is realized by the electric heater and the heat pump system together. In this way, the working range of the system can be further enlarged, thereby expanding the use range of the vehicle air conditioner, especially in the low temperature and very cold area.

Figure 2:
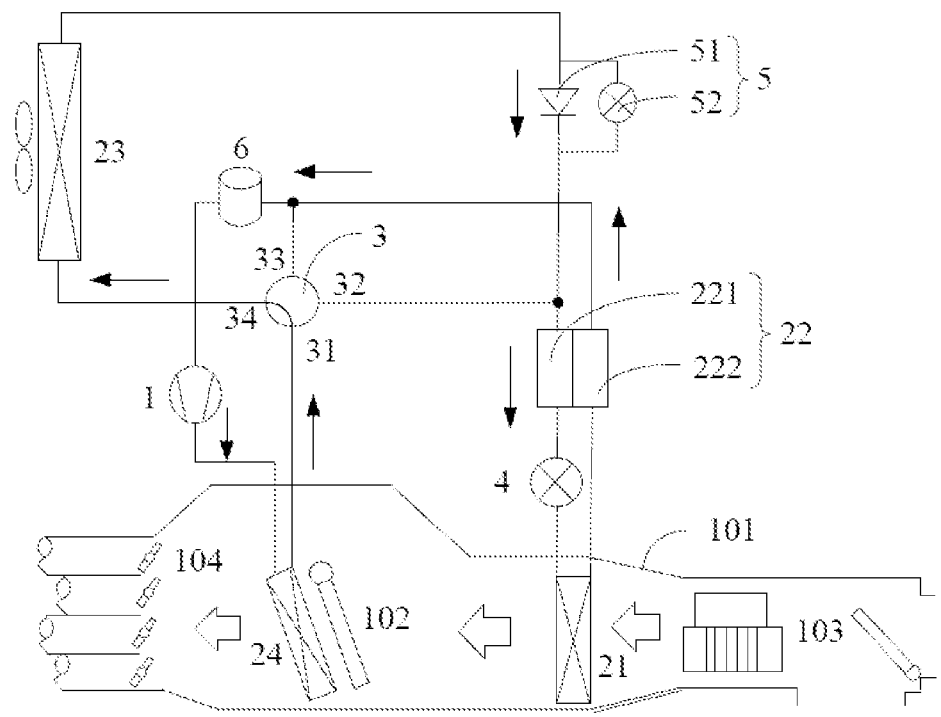
FIG. 2 is a schematic diagram of the heat pump system in a cooling mode according to an exemplary embodiment of the present application.

When the vehicle requires cooling in summer, the heat pump system is switched to the cooling mode. As shown in FIG. 2, in the cooling mode of an embodiment, the throttle element 4 throttles and depressurizes the refrigerant, the valve unit 51 is opened, and the first port 31 of the fluid switching device 3 communicates with the fourth port 34 of the fluid switching device 3. At this time, the compressor 1, the fourth heat exchanger 24, the fluid switching device 3, the third heat exchanger 23, the flow regulating device 5, the first heat exchange portion 221, the throttle element 4, the first heat exchanger 21, the second heat exchange portion 222, the gas-liquid separator 6 and the compressor 1 are communicated in sequence to form a loop.

In the cooling mode, the compressor 1 consumes a certain amount of electric energy to compress the gaseous refrigerant into a high-temperature and high-pressure gaseous refrigerant. The high-temperature and high-pressure gaseous refrigerant flows through the fourth heat exchanger 24, and flows to the third heat exchanger 23 through the fluid switching device 3 to exchange heat with the outdoor air flow, release heat into the ambient air, and get itself cooled. The refrigerant flows out of the third heat exchanger 23 and then flows to the flow regulating device 5. Since the valve unit 51 is opened, the refrigerant flows through the valve unit 51 and does not flow through the throttle unit 52 at this time. Then the refrigerant flows through the first heat exchange portion 221 of the second heat exchanger 22, and at this time, the refrigerant exchanges heat with the refrigerant in the second heat exchange portion 222 of the second heat exchanger 22. Since the refrigerant flowing through the second heat exchange portion 222 is a low-temperature refrigerant after heat exchange through the first heat exchanger 21, the refrigerant in the first heat exchange portion 221 can be further cooled after the heat exchange between the two. Then, the refrigerant flows to the first heat exchanger 21 after being throttled and cooled through the throttle element 4. The low-temperature and low-pressure liquid refrigerant absorbs the heat of the indoor air flow in the first heat exchanger 21 so as to cool the vehicle cabin. After the refrigerant absorbs heat, it undergoes a phase change or partial phase change and evaporates to absorb heat. The refrigerant after absorbing heat flows to the second heat exchange portion 222. At this time, the second heat exchange portion 222 exchanges heat with the refrigerant in the first heat exchange portion 221. The refrigerant in the second heat exchange portion 222 further heats up after the heat exchange of the refrigerant in the first heat exchange portion 221, and then flows to the gas-liquid separator 6. The gas refrigerant in the saturated state after separation by the gas-liquid separator 6 is compressed by the compressor 1 into a high temperature and high pressure gas refrigerant, and the cycle works in this way.

In the cooling mode of this embodiment, the high-temperature refrigerant from the third heat exchanger 23 and the low-temperature refrigerant from the first heat exchanger 21 exchange heat in the second heat exchanger 22 in counter-current flow, thereby greatly improving the refrigeration performance coefficient of the system.

In this embodiment, the blower 103 plays a role in conveying the indoor air flow. The indoor air flow is cooled by the first heat exchanger 21, and then blew into the vehicle cabin through the air duct and the grille 104 so as to reduce the temperature in the vehicle cabin and provide a comfortable riding environment. In addition, in the cooling mode, heating components such as batteries and motor inverters of electric vehicles also require a certain degree of cooling. For this reason, in this embodiment, a corresponding air duct can also be used to introduce corresponding cold air from the air duct to cool the batteries. In addition, a return air vent can also be provided in the cabin, and the cold air blown into the vehicle cabin can be blown to the batteries and other heat-generating components through the air duct after flowing through the vehicle cabin so as to cool the batteries and other heat-generating components.

In some working conditions, due to the heat exchange effect of the second heat exchanger 22, the degree of superheat of the low-pressure gas at the suction port of the compressor 1 may exceed a certain range. This will cause the suction mass flow of the compressor 1 to decrease and the exhaust temperature to be too high, which will affect the lubricating effect of the lubricating oil, the mechanical efficiency of the motor will decrease, and the energy efficiency of the air-conditioning system will decrease accordingly. The suction superheat degree of the compressor 1 is calculated from the suction temperature and the suction pressure of the compressor 1. A sensor is arranged at the suction port of the compressor 1, which can collect temperature and pressure at the same time.

In some heat pump systems, under heating conditions, the second heat exchanger 22 exerts its maximum heat exchange capacity. Due to the heat exchange effect of the second heat exchanger 22, the degree of superheat of the low pressure gas at the suction port of the compressor 1 will exceed a certain range. This will cause the suction mass flow of the compressor 1 to decrease and the exhaust temperature to be too high, which will affect the lubricating effect of the lubricating oil, the mechanical efficiency of the motor will decrease, and the energy efficiency of the heat pump system will decrease accordingly. In order to make the compressor 1 work in a higher operating range, the discharge temperature of the compressor 1 cannot be too high. Therefore, under some working conditions, the use of the second heat exchanger 22 will limit the operating range of the compressor 1 to a certain extent, which is detrimental to the performance of the system. For example, in an ultra-low temperature heating mode, in order to absorb heat in a lower ambient temperature, the system evaporation pressure is relatively low, and the compressor 1 pressure ratio is large. In order to keep the discharge temperature of the compressor 1 within the preset range, the discharge pressure of the compressor 1 is subject to certain restrictions, and the performance of the heat pump system is also restricted accordingly.

In some embodiments, the heat pump system of the present application further includes a flow control device connected to the second heat exchanger 22. The flow control device is used to control the flow of refrigerant flowing through the second heat exchanger 22. In this way, the heat exchange capacity of the second heat exchanger 22 becomes adjustable, so that the maximum performance of the heat pump system in the cooling mode can be exerted.

Figure 3:
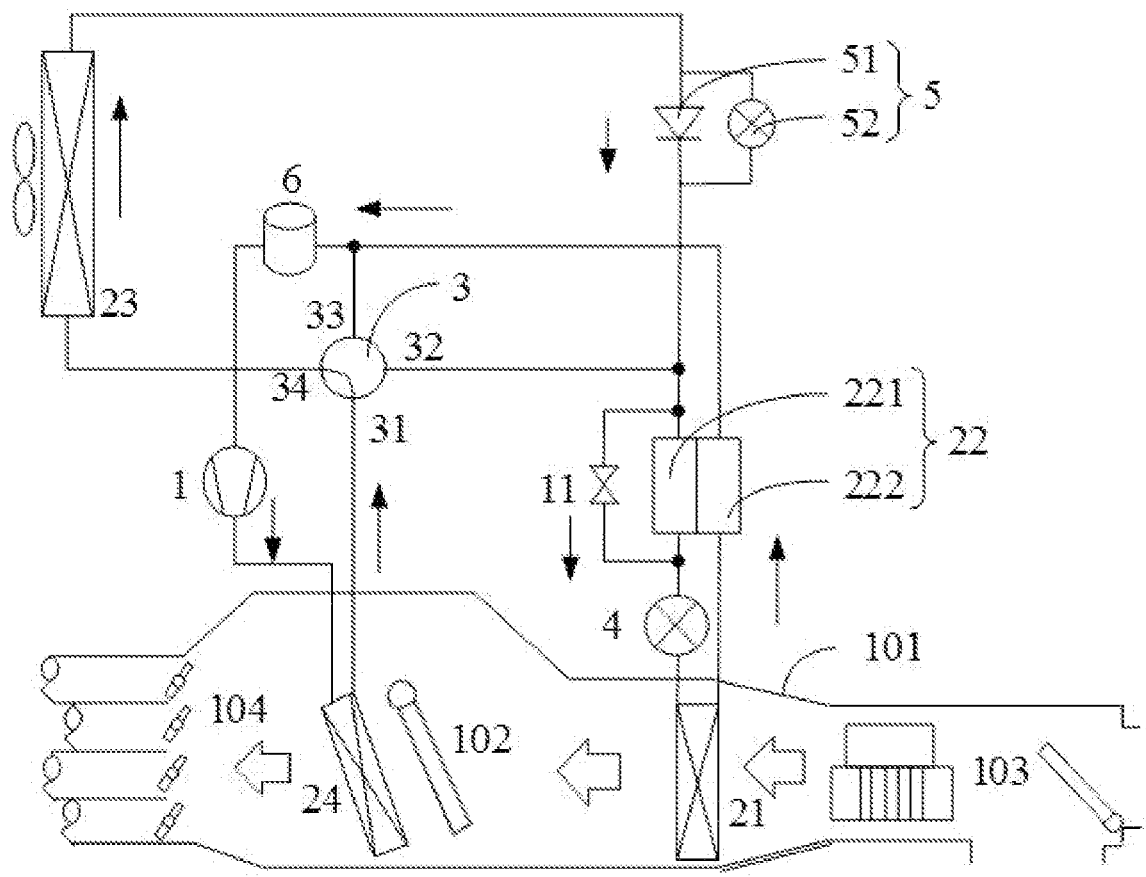
FIG. 3 is a schematic diagram of the heat pump system in a cooling mode according to another exemplary embodiment of the present application.

As shown in FIG. 3, in the cooling mode of another embodiment, the flow control device includes a first branch connected in parallel with the first heat exchange portion 221, and a first valve member 11. The first valve member 11 can control the flow of the refrigerant flowing through the first heat exchange portion 221 and the first branch. In this embodiment, the first valve member 11 is a flow regulating valve. The gas-liquid separator 6 contains pure gaseous refrigerant. Through the adjustment of the first valve member, the heat exchange between the first heat exchange portion 221 and the second heat exchange portion 222 in the second heat exchanger 22 can be controlled, and the heat exchange capacity of the second heat exchanger 22 can be adjusted. Therefore, the opening degree of the first valve member 11 is adjusted according to the suction pressure and/or the suction temperature of the compressor 1 through the control system, thereby controlling the heat exchange amount of the second heat exchanger 22. It avoids the performance degradation of the heat pump system due to the excessively high discharge temperature of the compressor 1.

Figure 4:
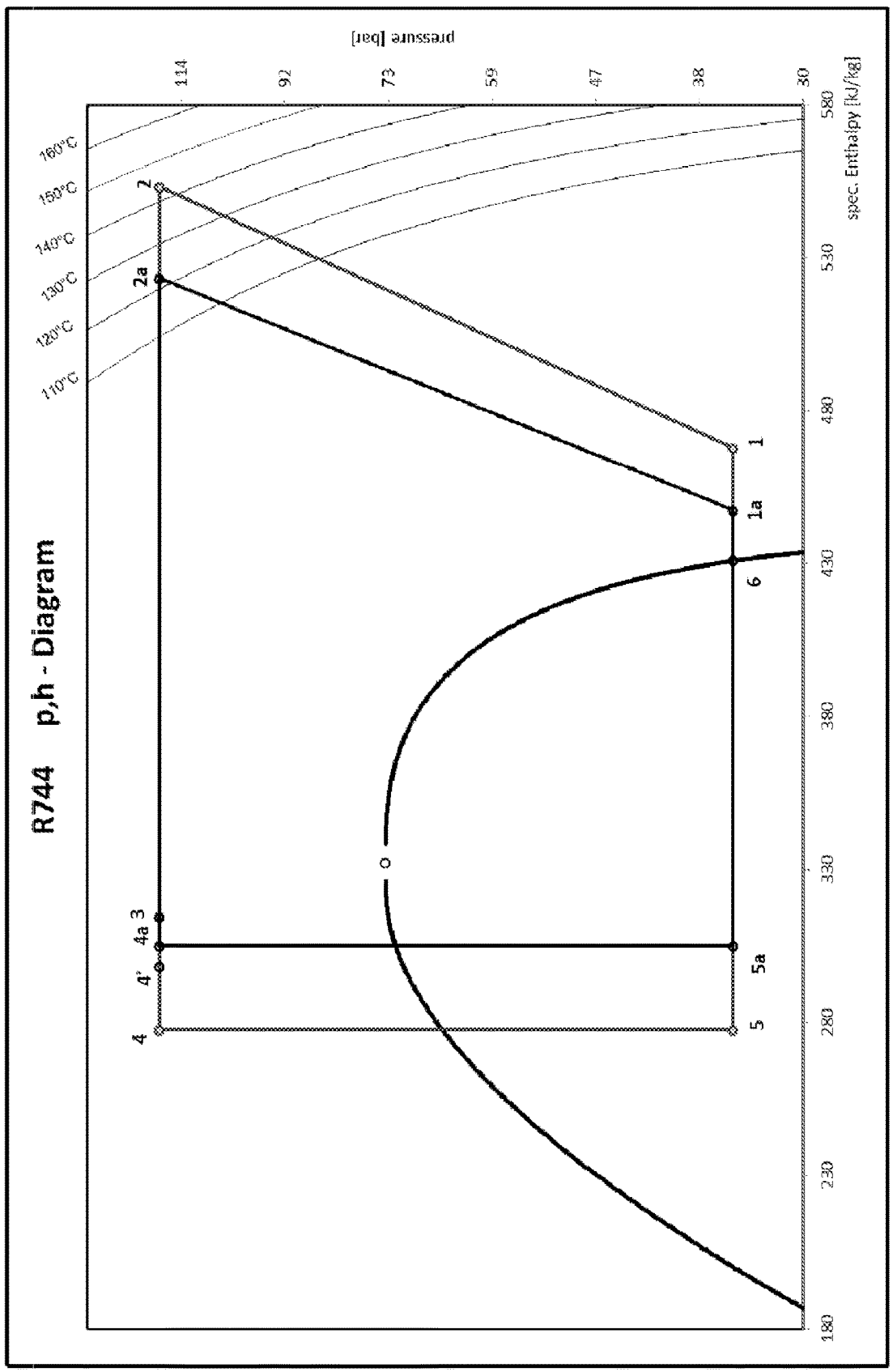
FIG. 4 is a pressure enthalpy diagram of the heat pump system shown in the embodiment of FIG. 3.

In an exemplary embodiment, as shown in FIGS. 3 and 4, when the flow control device is fully closed, the refrigerant circulation is as follows: 1-2-3-4-5-6-1. The processes of 6-1, 3-4 take place in the second heat exchanger 22. The refrigerant from the third heat exchanger 23 radiates heat from point 3 to point 4 through the first heat exchange portion 221. The low-pressure gas from the first heat exchanger 21 absorbs heat from the second heat exchange portion 222 and reaches point 1 from point 6. When the temperature at point 1 is relatively high, the temperature at point 2 is almost 150° C. Thus, the performance of the compressor can be improved by adjusting the flow control device.

When the flow control device is adjusted to a certain position, the refrigerant circulation is as follows: 1a-2a-3-4'-4a-5a-6-1a. 6-1a and 3-4' are changed in the second heat exchanger 22, and the heat exchange capacity of the second heat exchanger 22 is partially exerted. A part of the refrigerant coming out of the third heat exchanger 23 changes its temperature from the state point 3 to point 4' in the second heat exchanger 22. After that, the refrigerant mixes with another part of the refrigerant diverted from the first branch to reach the state point 4a, enters the throttle element 4 and then enters the first heat exchanger 21 after being throttled. Since only part of the high-pressure refrigerant flows and exchanges heat in the second heat exchanger 22, the heat exchange capacity of the second heat exchanger 22 is reduced. The low-pressure saturated gaseous refrigerant from the first heat exchanger 21 on the low-pressure side absorbs heat from the second heat exchange portion 222 and reaches point 1a from point 6 to point 2a, after being compressed by the compressor 1. The temperature at point 2a is significantly lower than 150° C.

Figure 5:
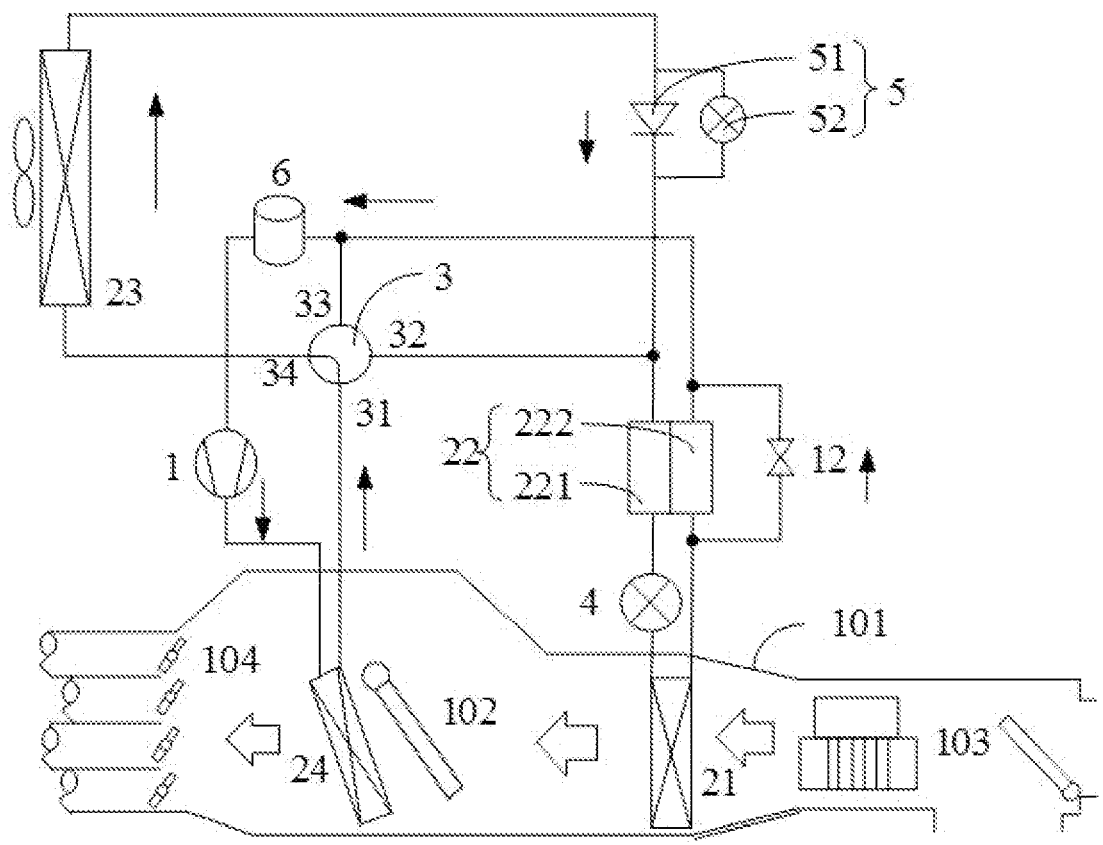
FIG. 5 is a schematic diagram of the heat pump system in a cooling mode according to another exemplary embodiment of the present application.

As shown in FIG. 5, in the cooling mode of another embodiment, the flow control device includes a second branch connected in parallel with the second heat exchange portion 222, and a second valve member 12. The second valve member 12 can control the flow of refrigerant flowing through the second heat exchange portion 222 and the second branch. In this embodiment, the second valve member 12 is a flow regulating valve. Through the adjustment of the second valve member 12, the heat exchange between the first heat exchange portion 221 and the second heat exchange portion 222 in the second heat exchanger 22 can be controlled, and the heat exchange capacity of the second heat exchanger 22 can be adjusted. Therefore, through controlling the system, according to the suction pressure and/or suction temperature of the compressor 1, the opening degree of the first valve member 12 is adjusted to control the heat exchange amount of the second heat exchanger 22. It avoids the performance degradation of the heat pump system due to the excessively high discharge temperature of the compressor 1.

Figure 6:
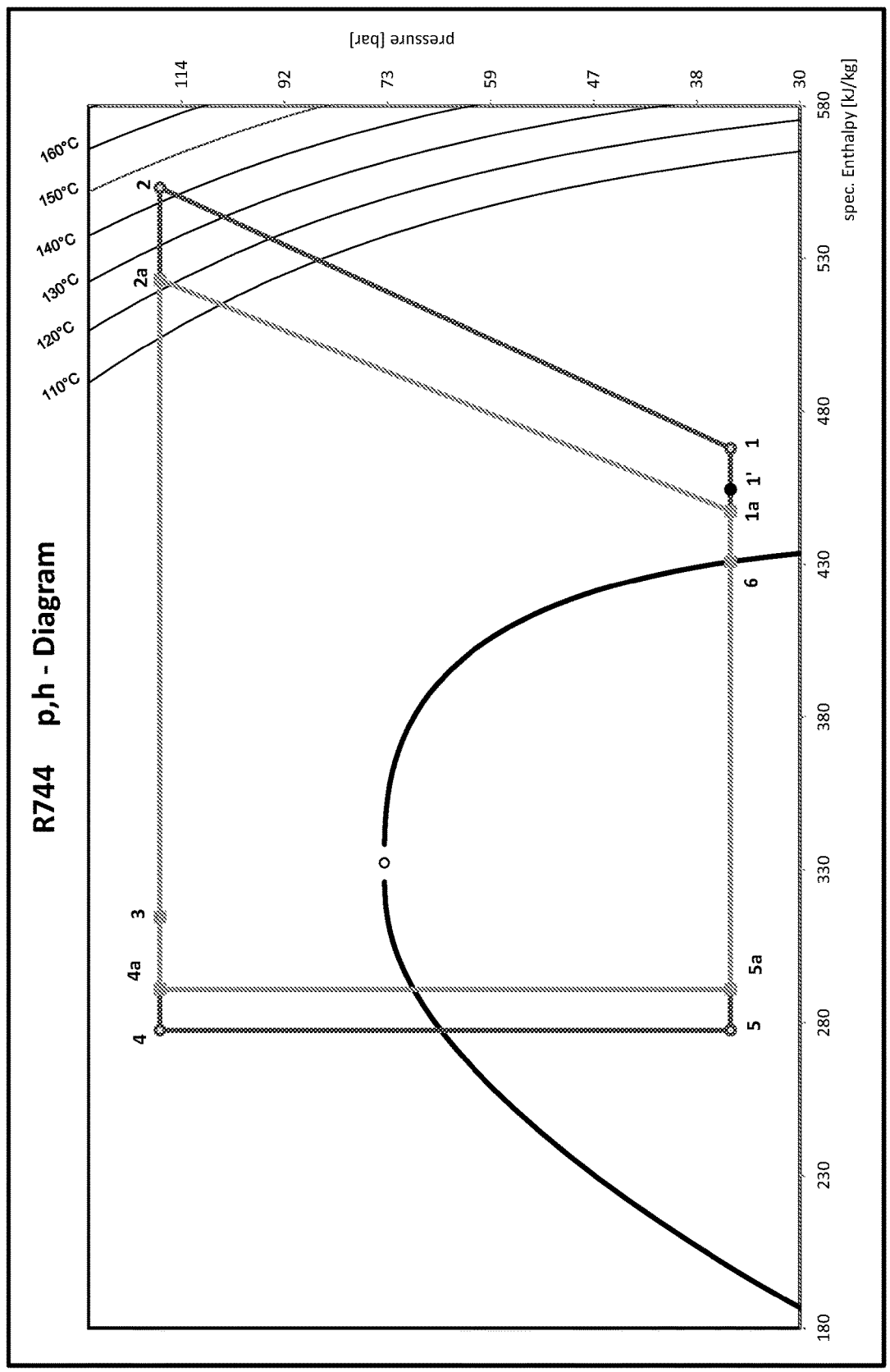
FIG. 6 is a pressure enthalpy diagram of the heat pump system shown in the embodiment of FIG. 5.

In an exemplary embodiment, as shown in FIGS. 5 and 6, when the flow control device is fully closed, the circulation is as follows: 1-2-3-4-5-6-1. The processes of 6-1, 3-4 take place in the second heat exchanger 22. The refrigerant from the third heat exchanger 23 radiates heat from point 3 to point 4 through the first heat exchange portion 221. The low-pressure saturated gas from the first heat exchanger 21 absorbs heat from the second heat exchange portion 222 and reaches point 1 from point 6. When the temperature at point 1 is relatively high, the temperature at point 2 is almost 150° C.

When the flow control device is adjusted to a certain position, the refrigerant circulation is as follows: 1a-2a-3-4a-5a-6-1'-1a. 6-1' and 3-4a occur in the second heat exchanger 22, and the heat exchange capacity of the second heat exchanger 22 is partially utilized. Part of the low-pressure saturated gaseous refrigerant from the third heat exchanger 23 absorbs heat from the second heat exchange portion 222 and reaches point 1' from point 6, and then mixes with another part of the low-pressure saturated gaseous refrigerant diverted from the second branch to reach the state point 1a. The refrigerant enters compressor 1, and reaches point 2a after compression. At this time, the temperature at point 2a has been significantly lower than 150°

C. Thereby, the suction pressure and the suction temperature of the compressor can be reduced, and the performance of the compressor can be improved.

Figure 7:
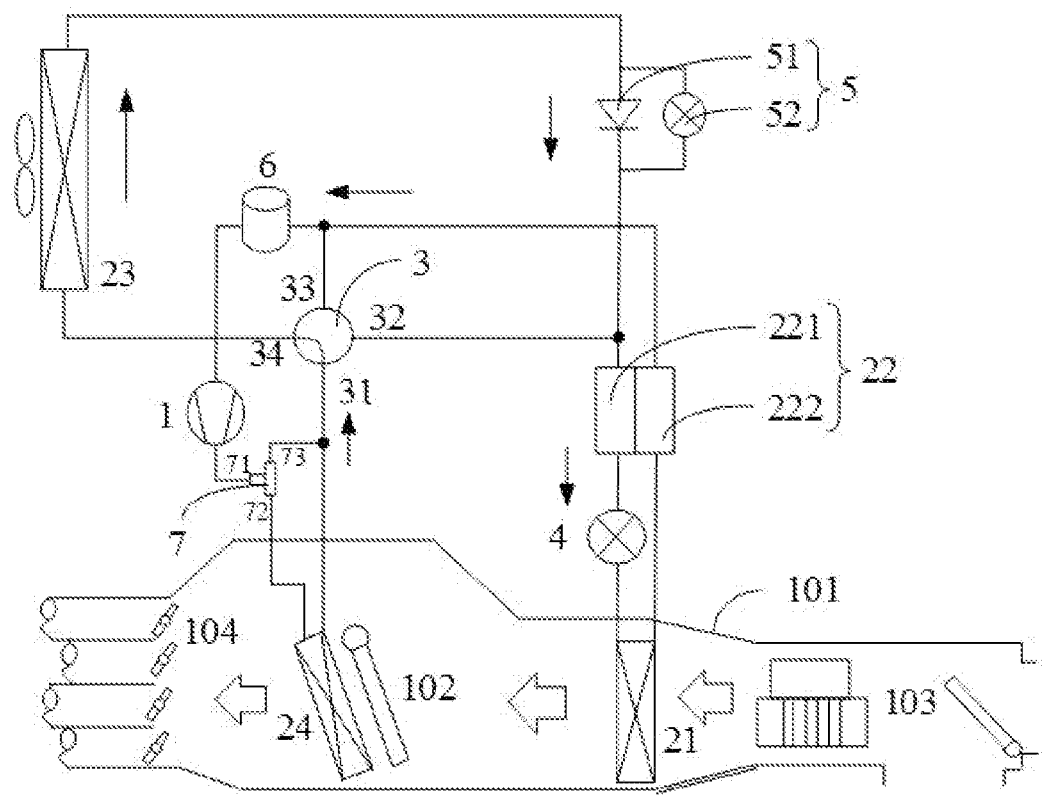
FIG. 7 is a schematic diagram of the heat pump system in a cooling mode according to another exemplary embodiment of the present application.

As shown in FIG. 7, in the cooling mode of another embodiment, the heat pump system further includes a three-way valve 7. The inlet of the fourth heat exchanger 24 is connected to the outlet of the compressor 1 through a three-way valve 7. The outlet of the fourth heat exchanger 24 is connected to the first port 31 of the fluid switching device 3. The three-way valve 7 includes a first connecting port 71, a second connecting port 72 and a third connecting port 73. The first connecting port 71 communicates with the outlet of the compressor 1, the second connecting port 72 communicates with the inlet of the fourth heat exchanger 24, and the third connecting port 73 communicates with the first port 31 of the fluid switching device 3. In the cooling mode of the heat pump system, the first connecting port 71 is in communication with the third connecting port 73. At this time, the refrigerant does not flow through the fourth heat exchanger 24, which reduces the release of heat to the vehicle cabin and reduces the requirements for the high temperature resistance of the air-conditioning box 101. At the same time, because the refrigerant does not flow through the fourth heat exchanger 24, the circulation resistance of the system refrigerant is reduced.

Figure 8:
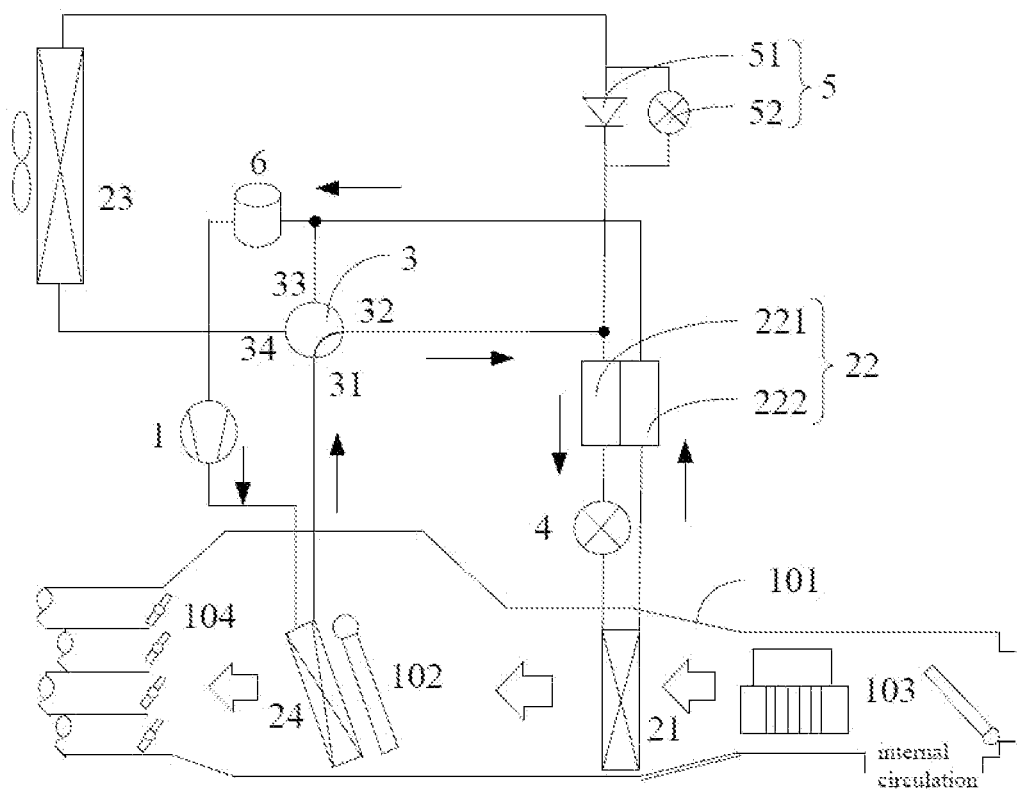
FIG. 8 is a schematic diagram of the heat pump system in a dehumidifying mode according to an exemplary embodiment of the present application.

When it is necessary to remove the moisture in the air in the vehicle cabin, the dehumidifying mode is activated. As shown in FIG. 8, in the dehumidifying mode of the heat pump system, the throttle element 4 is opened, the first port 31 of the fluid switching device 3 communicates with the second port 32 of the fluid switching device 3, the valve unit 51 is closed, and the throttle unit 52 is closed. At this time, the compressor 1, the fourth heat exchanger 24, the fluid switching device 3, the first heat exchange portion 221, the throttle element 4, the first heat exchanger 21, the second heat exchange portion 222, the gas-liquid separator 6 and compressor 1 are communicated in sequence to form a loop.

In the dehumidifying mode, the compressor 1 consumes a certain amount of electric energy to compress the low-pressure gaseous refrigerant into high-temperature and high-pressure gaseous refrigerant which flows into the fourth heat exchanger 24. Under the cooling of the indoor air flow, the heat of the refrigerant is transferred to a low-temperature indoor air flow. In some embodiments, at the fourth heat exchanger 24, by adjusting the opening of the damper, it is possible to choose whether the refrigerant exchanges heat with the indoor air flow. That is, when the temperature is low, the fourth heat exchanger 24 can be made to exchange heat with the indoor air flow, and when the temperature is relatively high, the fourth heat exchanger 24 can be made not to exchange heat with the indoor air flow. As shown in FIG. 8, the baffle 102 is opened, and the fourth heat exchanger 24 exchanges heat with the indoor air flow. The refrigerant flows from the fourth heat exchanger 24 to the first heat exchange portion 221 of the second heat exchanger 22 through the fluid switching device 3. The first heat exchange portion 221 exchanges heat with the second heat exchange portion 222. The refrigerant flows to the first heat exchanger 21 through the throttle element 4. The refrigerant exchanges heat with the indoor air flow through the first heat exchanger 21. Since the surface temperature of the first heat exchanger 21 is lower than the temperature in the vehicle cabin, the dew point temperature of the air before the first heat exchanger 21 is higher than the surface temperature of the first heat exchanger 21 during this process. In this way, moisture will be deposited on the surface of the first heat exchanger 21 due to condensation, and will be discharged through the provided pipe. As a result, the water vapor content in the air in the cabin is reduced. That is, the relative humidity is reduced so as to achieve the purpose of dehumidifying in the vehicle cabin. The refrigerant exits the first heat exchanger 21 and enters the second heat exchange portion 222. The refrigerant in the second heat exchange portion 222 further heats up after the heat exchange of the refrigerant in the first heat exchange portion 221, and then flows to the gas-liquid separator 6. The separated gas refrigerant by the gas-liquid separator 6 is compressed by the compressor 1 into a high-temperature and high-pressure gas refrigerant, and the cycle works in this way.

In this embodiment, the indoor air flow is cooled and dehumidified by the first heat exchanger 21, heated to a suitable temperature by the fourth heat exchanger 24, and then blown into the vehicle cabin through the air duct and the grille 104, thereby providing users with a comfort riding environment. The control of the indoor air flow temperature is achieved as follows: the opening angle of the baffle 102 can determine the proportion of the air flow flowing through the fourth heat exchanger 24 according to needs. The air flow flowing through the fourth heat exchanger 24 is heated, and then mixed with the original air flow to achieve the desired temperature. In some embodiments, if the temperature is relatively high, the opening degree of the baffle 102 at the fourth heat exchanger 24 can also be zero. That is, the air duct is bypassed, and the air is not allowed to flow through the fourth heat exchanger 24. In this way, when the high-temperature and high-pressure gaseous refrigerant exits the compressor 1 and flows through the fourth heat exchanger 24, the baffle 102 is closed. Therefore, the refrigerant flowing through the fourth heat exchanger 24 does not exchange heat with the air flow. When the temperature is low, the opening degree of the baffle 102 of the fourth heat exchanger 24 can be maximized. The air is flowed through the fourth heat exchanger 24, and the dehumidified air is heated up, and then sent into the vehicle cabin or on the windows through the air duct and the grille 104. This allows temperature and humidity to be controlled at the same time, so that the comfort level in the vehicle cabin can be improved. In addition, if quickly removing the mist or water vapor on the glass is required, the air door can be closed directly, and the cold air can be blown directly to the glass through the corresponding air duct so as to achieve the purpose of quickly removing the mist on the glass surface. Alternatively, in the dehumidifying mode, the heat pump system can select an internal circulation mode to reduce energy consumption.

Figure 9:
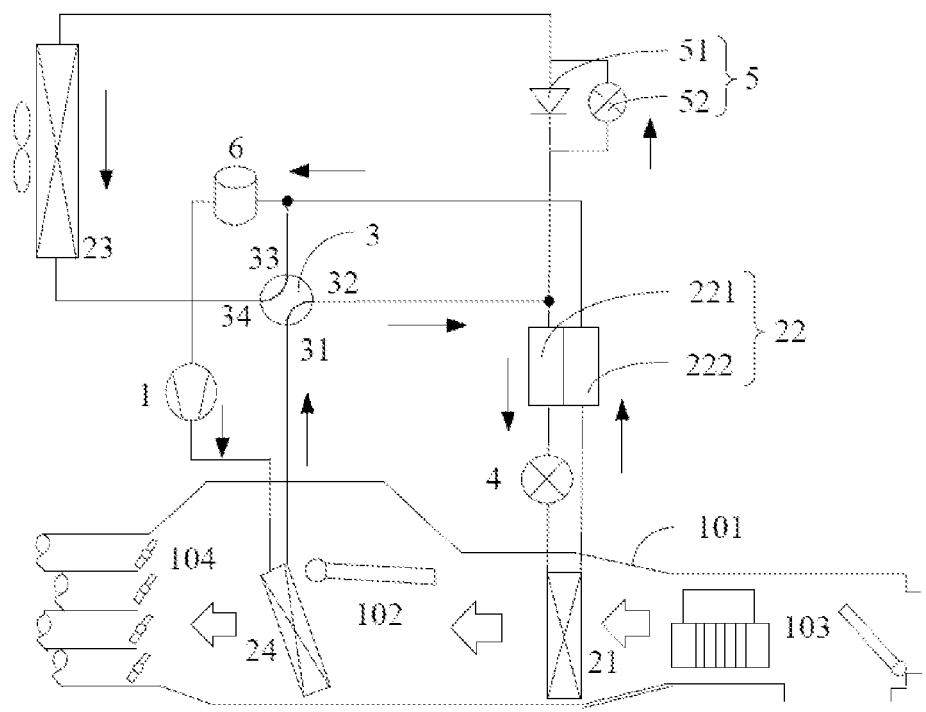
FIG. 9 is a schematic diagram of the heat pump system in a heating and dehumidifying mode according to an exemplary embodiment of the present application.

As shown in FIG. 9, in the heating and dehumidifying mode of the heat pump system, the throttle element 4 is opened, the flow regulating device 5 is opened, the first port 31 of the fluid switching device 3 communicates with the second port 32 of the fluid switching device 3, and the third port 33 of the fluid switching device 3 communicates with the fourth port 34 of the fluid switching device 3. At this time, the heating and dehumidifying mode has two refrigerant circulation loops at the same time. A first refrigerant circulation loop is the same as the above dehumidifying mode, which will not be repeated here. A second refrigerant circulation loop is as follows: the compressor 1, the fourth heat exchanger 24, the fluid switching device 3, the flow regulating device 5, the third heat exchanger 23, the fluid switching device 3, the gas-liquid separator 6, and the compressor 1 are communicated in sequence to form a loop. In the heating and dehumidifying mode, by adding the third heat exchanger 23 as an evaporator, in the heating and dehumidifying mode, the heating capacity is improved. This is suitable for situations where dehumidifying is required in a low temperature environment while more heat needs to be provided as well. Optionally, in the heating and dehumidifying mode, the heat pump system can select the internal circulation mode to reduce energy consumption.

In the second refrigerant circulation loop, the compressor 1 consumes a certain amount of electric energy to compress the low-pressure gaseous refrigerant into a high-temperature and high-pressure gaseous refrigerant which flows into the fourth heat exchanger 24. Under the cooling of the indoor air flow, the heat of the refrigerant is transferred to the low-temperature indoor air flow. The refrigerant flows out of the fourth heat exchanger 24 and then flows to the flow regulating device 5. At this time, since the flow direction of the refrigerant is different from that of the check valve 51 of the flow regulating device 5, the check valve 51 is closed, and the electronic expansion valve 52 of the flow regulating device 5 is opened. The refrigerant flows to the third heat exchanger 23 after being throttled and depressurized by the electronic expansion valve 52. In the third heat exchanger 23, the low-temperature and low-pressure liquid refrigerant exchanges heat with the outdoor air flow, absorbs external heat and evaporates to become a low-temperature and low-pressure gas refrigerant or a gas-liquid two-phase refrigerant. Then, the refrigerant flows to the gas-liquid separator 6 through the fluid switching device 3. After separation by the gas-liquid separator 6, the liquid refrigerant is stored in the gas-liquid separator 6, and the gaseous refrigerant enters the compressor 1 and is compressed by the compressor 1 into a high-temperature and high-pressure gaseous refrigerant.

In this embodiment, the indoor air flow is mixed air which flows through the internal circulation air outlet and the fresh air outlet. The mixing ratio can be adjusted by the system according to comfort requirements. The introduction of the internal circulation air in the present application can further save power consumption, and the proportion of the internal circulation air is aimed at not causing fogging of the vehicle windows.

In summary, an intermediate heat exchanger is added to the heat pump system of the present application. Under cooling conditions, the intermediate heat exchanger can be used to improve the cooling energy efficiency ratio of the system. In heating conditions, the intermediate heat exchanger is not used, so that the heating capacity of the heat pump system can be effectively used.

Those skilled in the art will easily think of other embodiments of the present application after considering the specification and practicing the invention disclosed herein. The present application is intended to cover any variation, use or adaptive change of this application. These variations, uses or adaptive changes follow the general principles of the present application and include common knowledge or conventional technical means in the technical field not disclosed in the present application. The description and the embodiments are only regarded as exemplary, and the true scope and spirit of the present application are pointed out by the claims of the present application.

It should be understood that the present application shall not be limited to the precise structures which have been described above and shown in the drawings, and various modifications and changes can be made without departing from its scope. The scope of the present application is only limited by the appended claims.

What is claimed is:

1. A heat pump system, comprising: a compressor, a first heat exchanger, a second heat exchanger, a third heat exchanger, a fourth heat exchanger, a flow regulating valve assembly, a fluid switching valve and a refrigerant throttling and depressurizing valve;
   the second heat exchanger comprising a first heat exchange portion and a second heat exchange portion which are capable of exchanging heat with each other, the refrigerant throttling and depressurizing valve being connected between an outlet of the first heat exchange portion and an inlet of the first heat exchanger, an inlet of the first heat exchange portion being capable of communicating with at least one of a second port of the third heat exchanger and an outlet of the fourth heat exchanger, and the flow regulating valve assembly being connected between the second port of the third heat exchanger and the inlet of the first heat exchange portion;
   the fluid switching valve having a first port, a second port, a third port and a fourth port, wherein the first port of the fluid switching valve is capable of communicating with the outlet of the compressor or the outlet of the fourth heat exchanger, the second port of the fluid switching valve is capable of communicating with the inlet of the first heat exchange portion and/or the flow regulating valve assembly, the third port of the fluid switching valve is capable of communicating with the outlet of the second heat exchange portion and/or the inlet of the compressor, and the fourth port of the fluid switching valve is capable of communicating with the first port of the third heat exchanger;
   a first port of the third heat exchanger being capable of communicating with an inlet of the compressor, and the outlet of the fourth heat exchanger being capable of communicating with the second port of the third heat exchanger through the flow regulating valve assembly; or, the first port of the third heat exchanger communicating with the outlet of the fourth heat exchanger, and the fourth heat exchanger being capable of communicating with the flow regulating valve assembly through the third heat exchanger;
   an inlet of the second heat exchange portion communicating with an outlet of the first heat exchanger, and an outlet of the second heat exchange portion being capable of communicating with the inlet of the compressor;
   the heat pump system comprising a heating mode in which the first port of the third heat exchanger is in communication with the inlet of the compressor, an outlet of the compressor is in communication with an inlet of the fourth heat exchanger, the outlet of the fourth heat exchanger is in communication with the second port of the third heat exchanger through the flow regulating valve assembly, the refrigerant throttling and depressurizing valve is closed, and the flow regulating valve assembly throttles and depressurizes a refrigerant;
   the heat pump system comprises a cooling mode in which the outlet of the compressor, the fourth heat exchanger, the first port of the fluid switching valve, the fourth port of the fluid switching valve, the third heat exchanger, the flow regulating valve assembly, the first heat exchange portion, the refrigerant throttling and depressurizing valve, the first heat exchanger, the second heat exchange portion, and the inlet of the compressor are communicated in sequence;
   the heat pump system further comprises a refrigerant flowing control branch connected to the second heat exchanger, and the refrigerant flowing control branch is used to control flow of the refrigerant flowing through the second heat exchanger in the cooling mode;

wherein the refrigerant flowing control branch comprises a first branch connected in parallel with the first heat exchange portion and a first flow regulating valve disposed at the first branch, the first branch has a first connection position connected to an inlet side of the first heat exchange portion and a second connection position connected to an outlet side of the first heat exchange portion, the second connection position is located between the first heat exchange portion and the refrigerant throttling and depressurizing valve; when the heat pump system operates under the cooling mode, at least part of the refrigerant flows through the first heat exchange portion, and the first flow regulating valve is configured for controlling the flow of the refrigerant flowing through the first heat exchange portion and the first branch; or the refrigerant flowing control branch comprises a second branch connected in parallel with the second heat exchange portion and a second flow regulating valve disposed at the second branch, the second branch has a third connection position connected to an inlet side of the second heat exchange portion and a fourth connection position connected to an outlet side of the second heat exchange portion, the third connection position is located between the inlet side of the second heat exchange portion and an outlet side of the first heat exchanger; when the heat pump system operates under the cooling mode, at least part of the refrigerant flows through the second heat exchange portion, and the second flow regulating valve is configured for controlling the flow of the refrigerant flowing through the second heat exchange portion and the second branch.

2. The heat pump system according to claim 1, wherein the heat pump system further comprises a three-way valve having a first connecting port, a second connecting port and a third connecting port, the first connecting port communicates with the outlet of the compressor, the second connecting port communicates with the inlet of the fourth heat exchanger, and the third connecting port communicates with the first port of the fluid switching valve; and wherein in the cooling mode of the heat pump system, the first connecting port is in communication with the third connecting port.

3. The heat pump system according to claim 1, wherein the heat pump system further comprises a dehumidifying mode in which the outlet of the compressor is in communication with the inlet of the fourth heat exchanger, the refrigerant throttling and depressurizing valve is opened, the first port of the fluid switching valve is in communication with the second port of the fluid switching valve, and the flow regulating valve assembly is closed.

4. The heat pump system according to claim 1, wherein the heat pump system further comprises a heating and dehumidifying mode in which the first port of the third heat exchanger is in communication with the inlet of the compressor, the outlet of the compressor is in communication with the inlet of the fourth heat exchanger, the refrigerant throttling and depressurizing valve is opened, the flow regulating valve assembly is opened, the first port of the fluid switching valve is in communication with the second port of the fluid switching valve, and the third port of the fluid switching valve is in communication with the fourth port of the fluid switching valve.

5. The heat pump system according to claim 1, wherein the heat pump system further comprises a gas-liquid separator, an inlet of the gas-liquid separator is capable of communicating with the first port of the third heat exchanger and/or the outlet of the second heat exchange portion, and an outlet of the gas-liquid separator is in communication with the inlet of the compressor.

6. A heat pump system, comprising: a compressor, a first heat exchanger, a second heat exchanger, a third heat exchanger, a flow regulating valve assembly and a refrigerant throttling and depressurizing valve; the first heat exchanger being located in an air-conditioning box; the third heat exchanger having a first port and a second port;

the second heat exchanger comprising a first heat exchange portion and a second heat exchange portion which are capable of exchanging heat with each other, the refrigerant throttling and depressurizing valve being connected between an outlet of the first heat exchange portion and an inlet of the first heat exchanger, an inlet of the first heat exchange portion being capable of communicating with the second port of the third heat exchanger, the flow regulating valve assembly being connected between the second port of the third heat exchanger and the inlet of the first heat exchange portion;

an inlet of the second heat exchange portion communicating with an outlet of the first heat exchanger, and an outlet of the second heat exchange portion communicating with an inlet of the compressor;

wherein the heat pump system comprises a cooling mode in which an outlet of the compressor is in communication with the first port of the third heat exchanger, the second port of the third heat exchanger is in communication with the refrigerant throttling and depressurizing valve through the flow regulating valve assembly and the first heat exchange portion, the refrigerant throttling and depressurizing valve is in communication with the inlet of the first heat exchanger, the outlet of the first heat exchanger is in communication with the inlet of the compressor through the second heat exchange portion, the refrigerant throttling and depressurizing valve throttles and depressurizes a refrigerant, and the flow regulating valve assembly is opened;

the heat pump system further comprises a refrigerant flowing control branch connected to the second heat exchanger, and the refrigerant flowing control branch is used to control flow of the refrigerant flowing through the second heat exchanger in the cooling mode;

wherein the refrigerant flowing control branch comprises a first branch connected in parallel with the first heat exchange portion and a first flow regulating valve disposed at the first branch, the first branch has a first connection position connected to an inlet side of the first heat exchange portion and a second connection position connected to an outlet side of the first heat exchange portion, the second connection position is located between the first heat exchange portion and the refrigerant throttling and depressurizing valve; when the heat pump system operates under the cooling mode, at least part of the refrigerant flows through the first heat exchange portion, and the first flow regulating valve is configured for controlling the flow of the refrigerant flowing through the first heat exchange portion and the first branch; or the refrigerant flowing control branch comprises a second branch connected in parallel with the second heat exchange portion and a second flow regulating valve disposed at the second branch, the second branch has a third connection position connected to an inlet side of the second heat exchange portion and a fourth connection position connected to an outlet side of the second heat exchange portion, the third connection position is located between the inlet side of the second heat exchange portion and an outlet side of the first heat exchanger; and when the heat pump system operates under the cooling mode, at least part of the refrigerant flows through the second heat exchange portion, the second flow regulating valve is configured for controlling the flow of the refrigerant flowing through the second heat exchange portion and the second branch;

wherein the heat pump system further comprises a fourth heat exchanger and a fluid switching valve having a first port, a second port, a third port and a fourth port, the fourth heat exchanger is located in the air-conditioning box, and the inlet of the first heat exchange portion is capable of communicating with at least one of the second port of the third heat exchanger and an outlet of the fourth heat exchanger;

the first port of the third heat exchanger is capable of communicating with the inlet of the compressor, and the outlet of the fourth heat exchanger is capable of communicating with the second port of the third heat exchanger through the flow regulating valve assembly; or, the first port of the third heat exchanger communicates with the outlet of the fourth heat exchanger, and the fourth heat exchanger is capable of communicating with the flow regulating valve assembly through the third heat exchanger;

the first port of the fluid switching valve is capable of communicating with the outlet of the compressor or the outlet of the fourth heat exchanger, the second port of the fluid switching valve is capable of communicating with the inlet of the first heat exchange portion and/or the flow regulating valve assembly, the third port of the fluid switching valve is capable of communicating with the outlet of the second heat exchange portion and/or the inlet of the compressor, and the fourth port of the fluid switching valve is capable of communicating with the first port of the third heat exchanger.

7. The heat pump system according to claim 6, wherein the heat pump system comprises a heating mode in which the first port of the third heat exchanger is in communication with the inlet of the compressor, an outlet of the compressor is in communication with an inlet of the fourth heat exchanger, the outlet of the fourth heat exchanger is in communication with the second port of the third heat exchanger through the flow regulating valve assembly, the refrigerant throttling and depressurizing valve is closed, and the flow regulating valve assembly throttles and depressurizes the refrigerant;

in the heating mode, the outlet of the fourth heat exchanger communicates with the first port of the fluid switching valve; the first port of the fluid switching valve is in communication with the second port of the fluid switching valve; the refrigerant flows to the third heat exchanger after being throttled and depressurized by the flow regulating valve assembly; the third port of the fluid switching valve is in communication with the fourth port of the fluid switching valve, and the third port of the fluid switching valve is in communication with the inlet of the compressor.

8. The heat pump system according to claim 6, wherein in the cooling mode, the outlet of the compressor communicates with the inlet of the fourth heat exchanger, the outlet of the fourth heat exchanger communicates with the first port of the fluid switching valve; the first port of the fluid switching valve communicates with the fourth port of the fluid switching valve; the flow regulating valve assembly communicates with the third heat exchanger and the first heat exchange portion; and the refrigerant flows to the first heat exchanger after being throttled and depressurized by the refrigerant throttling and depressurizing valve.

9. The heat pump system according to claim 6, wherein the heat pump system further comprises a three-way valve having a first connecting port, a second connecting port and a third connecting port, the first connecting port communicates with the outlet of the compressor, the second connecting port communicates with the inlet of the fourth heat exchanger, and the third connecting port communicates with the first port of the fluid switching valve; and wherein
in the cooling mode, the first connecting port is in communication with the third connecting port.

10. The heat pump system according to claim 6, wherein the heat pump system comprises a dehumidifying mode in which the outlet of the compressor is in communication with the inlet of the fourth heat exchanger, the inlet of the first heat exchange portion communicates with the outlet of the fourth heat exchanger, the flow regulating valve assembly is closed, and the refrigerant throttling and depressurizing valve throttles and depressurizes the refrigerant;

in the dehumidifying mode, the outlet of the fourth heat exchanger communicates with the first port of the fluid switching valve; the first port of the fluid switching valve communicates with the second port of the fluid switching valve; the refrigerant flows to the first heat exchanger after being throttled and depressurized by the refrigerant throttling and depressurizing valve; the outlet of the second heat exchange portion is in communication with the inlet of the compressor; the third heat exchanger communicates with the outlet of the flow regulating valve assembly, and the flow regulating valve assembly is closed in the dehumidifying mode.

11. The heat pump system according to claim 6, wherein the heat pump system comprises a heating and dehumidifying mode in which the second port of the third heat exchanger and the outlet of the fourth heat exchanger are both in communication with the inlet of the first heat exchange portion, the first port of the third heat exchanger communicates with the inlet of the compressor, the outlet of the compressor is in communication with the inlet of the fourth heat exchanger, the refrigerant throttling and depressurizing valve is opened, and the flow regulating valve assembly is opened;

in the heating and dehumidifying mode, the outlet of the fourth heat exchanger communicates with the first port of the fluid switching valve; the first port of the fluid switching valve is in communication with the second port of the fluid switching valve; the refrigerant flows to the first heat exchanger after being throttled and depressurized by the refrigerant throttling and depressurizing valve, the outlet of the second heat exchange portion communicates with the inlet of the compressor; the flow regulating valve assembly communicates the second port of the fluid switching valve and the third heat exchanger; the third port of the fluid switching valve is in communication with the fourth port of the fluid switching valve, and the third port of the fluid switching valve communicates with the inlet of the compressor.

12. The heat pump system according to claim 6, wherein the flow regulating valve assembly comprises an electronic expansion valve and a check valve connected in parallel.

* * * * *